Figure 3:
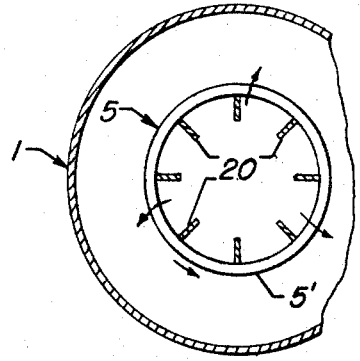

United States Patent [19]
Fournier

[11] 3,750,885
[45] Aug. 7, 1973

[54] STRAINER APPARATUS WITH POWER ASSISTED CLEANING MEANS

[75] Inventor: Paul W. Fournier, Saint Paul, Minn.

[73] Assignee: Universal Oil Products Company, Des Plains, Ill.

[22] Filed: June 28, 1971

[21] Appl. No.: 157,563

[52] U.S. Cl.............. 210/107, 210/108, 210/391, 210/497.1
[51] Int. Cl............................................. B01d 27/02
[58] Field of Search.................. 210/77, 107, 108, 210/391, 393, 411, 412, 456, 497.1, 354

[56] References Cited
UNITED STATES PATENTS

| 3,363,771 | 1/1968 | Walters | 210/391 X |
| 3,481,474 | 12/1969 | Paulson | 210/497.1 |
| 3,448,858 | 6/1969 | Delcellier et al. | 210/354 X |

*Primary Examiner*—John Adee
*Attorney*—James R. Hoatson, Jr. et al.

[57] ABSTRACT

An improved strainer device is constructed so as to have rotatability of a cylinder-form screen filter by motor means such that flow blocking particles can be more readily washed off and removed from the outside of the screen by "shear" action and by a back-washing flow. A preferred design uses a wedge-form of self-cleaning screen and peripherally spaced internal vertical bar means to enhance an outward radial flow which may be continuous, or peridically operated, to effect the removal of clogging material.

10 Claims, 5 Drawing Figures

PATENTED AUG 7 1973 3,750,885

INVENTOR:
Paul W. Fournier

BY: James P. Hoatson, Jr.
Philip T. Liggett
ATTORNEYS

STRAINER APPARATUS WITH POWER ASSISTED CLEANING MEANS

This invention relates to an improved form of filter or strainer apparatus where there is means for at least periodically rotating a cylindrical screen member so as to provide for the easier removal of screen clogging particulates. More specifically, motor means connective with the central cylindrical form screen, together with longitudinal bars or vanes spaced inside of the screen, will serve to reverse at least a part of the fluid flow through the screen and thus remove particles which may have adhered to the outside of the screen.

Various types of filters or separator devices provide for a radial inward filtering flow of a fluid stream and it is not unusual to provide reverse fluid flows for cleaning the filtering screen; however, none of the known filtering or straining devices provide for rotation of the screen section such that a centrifugal type or reverse flow can act together with "shear effect" to dislodge particles from the screen surface. It should also be pointed out that the present invention differentiates from rotating filters, which use a scraping bar to remove a filter cake from a relatively large diameter screen, in that the present design incorporates means for the rotation of a relatively small diameter cylindrical screen section at a rate sufficient to provide "shear" forces and, additionally, cause an outward radial dislodgement of collected particles. Various types of motor means may be used to rotate the inner screen; although where an air- or other fluid-powered rotor is used there can be a discharge of the exhaust stream into the interior of the cylinder-form screen and the utilization of such exhaust to aid in providing a back-wash flow through the screen section.

The self-cleaning filter unit of the present invention is somewhat related to the centrifugal form of fluid strainer as disclosed in a Paulson U.S. Pat. No. 3,481,474; however, the latter has no means provided for rotating the screen section and must depend upon downward spiral flow and the rotating ball means to help remove particulates from the unit.

In any event, it may be considered a principal object of the present invention to provide a rotatable inner filtering screen in a cylinder form of filter unit so as to provide for enhanced particle removing "shear action" as well as for a back flow of liquid through the screen. This basic rotative cleaning is of particular advantage for long screen lengths with large surface areas as compared to the end flow area of the cylinder available for a back-wash stream.

A further object of the invention relates to the provision of longitudinal blades or vanes as part of the interior of the screen section such that back-washing flow is enhanced by the rotation of the screen.

A still further object of the present invention relates to the provision of timing means and/or to the use of pressure drop measuring means and flow control means such that the screen rotation and/or back-washing back-flow can be initiated as may be needed for a particular filtering operation by starting a motor and by adjustment of one or more valving means.

In a broad aspect, the present invention is directed to an improved fluid strainer apparatus which provides for the passage of a fluid stream flow around and into a cylindrical screen that is positioned to have a cleaned stream removed longitudinally from within such screen and particulates removed from therearound, with the improved construction providing for the powered turning of the cylindrical screen to enhance removal of lodged particulates in a manner which comprises in combination: (a) rotatable support means for the cylindrical screen; (b) motor means connective with said screen for at least periodically rotating such screen; and, (c) internal vane means within said screen positioned to enhance an outward flow of a portion of the fluid to thereby aid in cleaning the outside of the screen during periods of its rotation.

The present form of rotatable screen to have self-cleaning from "shear" and back-wash of particles can be used alone as, for example, around an intake in a large vat or pond; however, it will probably be used more typically in a confined chamber where there can be a controlled removal of particulates from around the screen.

Various types of motor means may be utilized to effect the rotation of the screen member so as to effect the shear action which will in turn assist particle removal from the surface of the screen. Also, a preferred construction and operation of the unit may incorporate a timing means which will periodically cause the motor to operate the screen rotation. In lieu of timer means, or in combination therewith, there can be pressure sensitive means across the filter that can note a pressure drop change so as to effect the desired periodical rotation of the screen means responsive to an undue pressure drop reading. At the same time, the timer means and/or the pressure drop indicating means can, through suitable control means, effect the opening and closing of valving means connective with the filtering device such that there may be a back-washing flow through the screen portion of the unit to enhance the particle removing operation from the filtering screen surface.

It may also be noted that it may be of advantage to utilize an air motor, or similar type of fluid motor, whereby an air supply or a water stream operating an impeller means will effect the cylindrical screen rotation, with such hydraulic or air motor means being started and stopped responsive to solenoid valve means receiving a signal from the timer or pressure control means. Still further, it may be of advantage to provide for the discharge of the air motor, or of the hydraulic motor, to flow interiorly of the cylindrical screen to provide an additional cleaning effect during the back-wash period, or during any rotational period where particles are being removed by the rotational shear effect in the dislodgement of surface particles.

Inasmuch as a rotational effect is being utilized in the present improved self-cleaning filtering unit to cause particle dislodgement, there can be an enhanced effect through the use of longitudinal bars or vanes that extend at spaced locations along the interior face of the cylindrical-form screen member such that there is a pumping effect from such vanes by causing localized outward flow of fluid through the screen while it is being rotated. Actually, in the operation of the unit, the space around the cylindrical-form unit is similar to that provided in a cyclone type separator where the laden inlet stream will enter the chamber tangentially and pass in a centrifugally spiraling flow through an annular zone between a cylindrical-form screen and the inner wall of the chamber, and the fluid outlet from the unit extends axially from the inner portion of the inner cylindrical screen, whereby particulates are removed by the outer face of the screen member and there is a radial inward flow of the cleaned fluid stream into the interior portion of the filtering member. However, in accordance with the present invention, there can be an assist to the removal of the deposited particulates from the outer face of the screen member by rotation of the latter and a shearing action initiated to dislodge particles from the screen face. Dislodged particles are permitted to settle into the lower end of the chamber and be removed in a periodical or continuous bleed stream by way of port means at the lower end of the filtering chamber. It is contemplated that the present unit will have an inner rotatable screen member retained stationary except at such times, that may be determined by the operating conditions, when it will have periodical rotations and cleanings. However, with certain processing conditions, it may be advisable to maintain a continuous slowly moving operation for the rotatable cylinder-form screen whereby there is continuous radial inward flow of the laden stream through the screen section while simultaneously providing for a continuous dislodgement of particles by the rotating shear action as well as from some measure of local back-wash flow through the cylinder screen by virtue of the vanes provided inside of the screen section.

It is not intended to limit the present invention to any one type of screen construction or to any particular form of "vane members" within the screen; although in a preferred construction there will be utilized a cylinder form of screen which comprises the use of wedge-shaped wire wrapped around spaced longitudinal rods whereby the open area of the screen is provided by the continuous helical slot between the adjacent helical windings of the wedge-shaped wire. Further, the wedge-shaped wire is preferably oriented so that the wide portion follows along the outer face of the screen and provides a resulting slot between adjacent wire that increases in its cross-sectional area toward the inside of the screen to result in a non-clogging self-cleaning type of construction. Inasmuch as the wedge-shaped wire forming the screen is typically spirally or helically wound around spaced apart rods, it is contemplated that such rods may be formed to be of a bar shape or even curved into a vane type of configuration and thus serve as the internal vane means which will enhance radial outward flow of the back-washing fluid stream for assistance in particle removal from the outer surface of the screen.

Reference to the accompanying drawing and the following description thereof will serve to illustrate one embodiment of the present invention as well as permit the illustration of optional advantageous features which may be integrated into the basic design.

Figure 1:
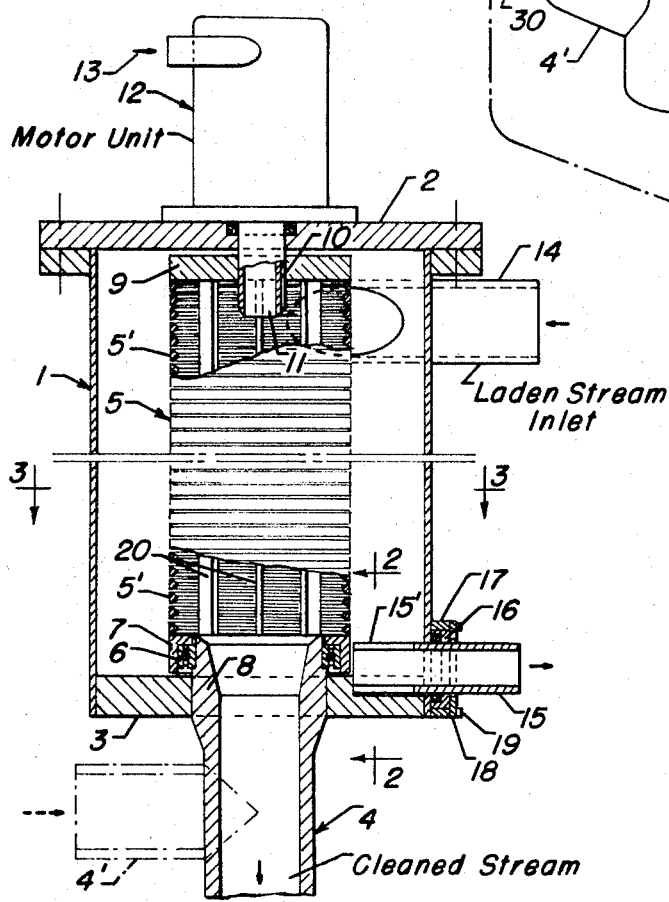

FIG. 1 of the drawing is a sectional elevational view indicating the use of a cylinder-form rotatable screen member within a cylindrical form housing that is adapted to effect the filtering of a particle laden stream and permit enhanced particle removal from the screen member by rotative movement of the screen.

Figure 2:
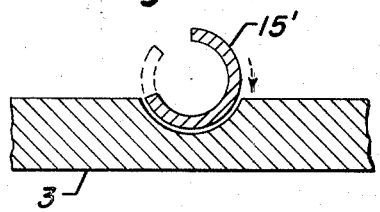

FIG. 2 of the drawing is a sectional view through a particle removing outlet means at the lower end of the chamber, as indicated by line 2—2 in FIG. 1.

FIG. 3 of the drawing is a partial sectional plan view through the filtering apparatus showing rectangular bar members as the longitudinal support means for the helical wound wire portion forming the outer surface of the inner screen member, in accordance with line 3—3 of FIG. 1.

Figure 4:
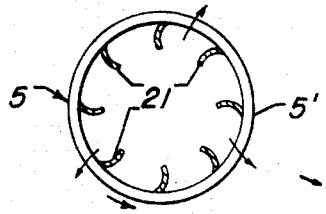

FIG. 4 of the drawing illustrates the use of spaced curve bar members as the spaced support means for the helically wound wire of the interior screen member, whereby there are resulting vane type of configurations to the support bars within the central screen member.

Figure 5:
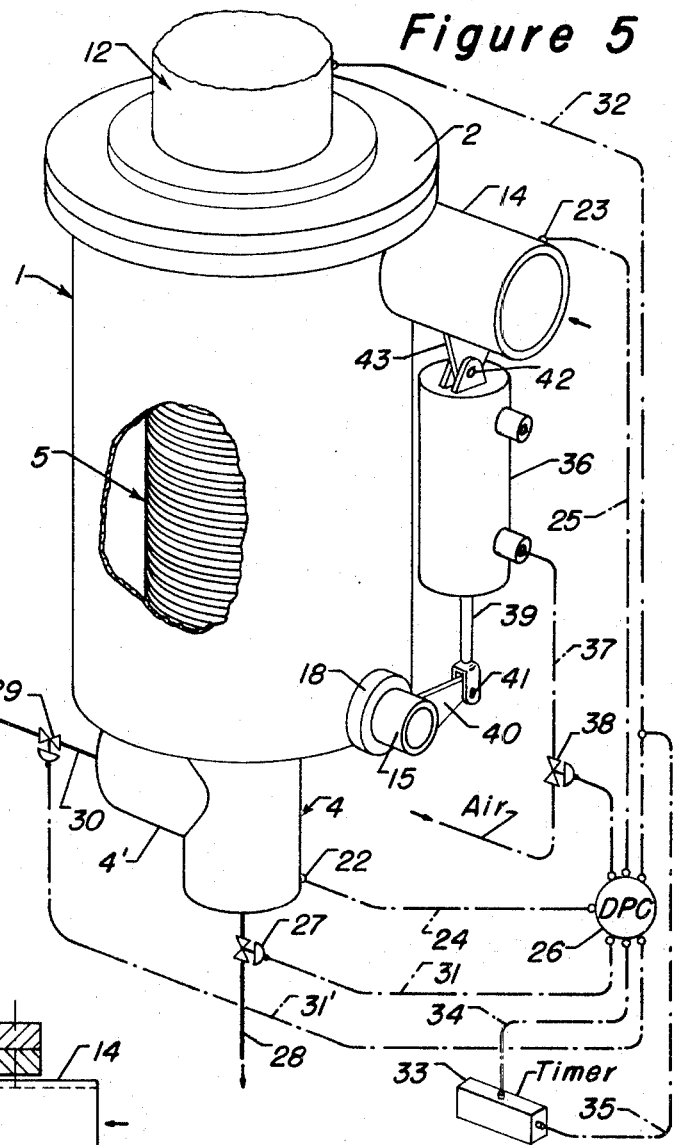

FIG. 5 illustrates in a partial isometric type of view and in a diagrammatic manner, the utilization of timer means connective with control means such that there may be periodic operation of the motor means to effect the rotation of the inner cylinder-form screen as well as the opening and closing of fluid lines to control backwashing through the screen member. Additionally, FIG. 5 illustrates the utilization of an air cylinder or other piston type means connective to a particle outlet means and a differential pressure control means responsive to pressure taps to inlet and outlet portions of the device such that there may be rotation of the screen and a "back flow" action responsive to a pressure drop change rather than to the timer means.

Referring now particularly to FIGS. 1, 2 and 3 of the drawing, there is shown an outer housing or chamber 1 with a removable top cover portion 2 and a lower section or bottom section 3 with fluid port means 4. Positioned axially or centrally within the chamber 1 is a cylinder-form screen 5 mounted in a manner to be rotatably movable within the chamber. Specifically, at the lower end portion of the present embodiment, there is indicated the use of a seal type of roller bearing 6 between a lower flanged portion 7 on screen 5 and an inwardly projecting end portion 8 for the port means 4. At the upper end of the screen, there is illustrated the keying of a top end member 9 at 10 to a hollow shaft section 11 which in turn extends downwardly from a motor means 12 which is supported by the cover member 2. The motor unit 12 may be an electrical motor directly mounted on the cover 2 or might comprise a gear box or other drive unit in turn connective with a motor at a position other than directly over the cover member 2. In still other instances, although not shown, there may be V-belt drive means to the shaft, such as 11, which is connective with the internal screen member 5 so that the motor drive is again remote from cover member 2. On the other hand, the motor unit may comprise a hydraulic motor or an air motor such as illustrated diagrammatically in FIG. 1 where the fluid medium enters inlet means 13 of the motor unit 12 to act upon internal blade means providing for the rotation of the short shaft member 11, while at the same time there may be a discharge of the air or the hydraulic medium downwardly into the interior of rotatable screen member 5 so as to provide an additional cleaning effect in dislodging particles from the outer surface of the screen.

In a normal operation of the present filtering unit, the laden particle stream enters chamber 1 tangentially by means of inlet port 14 so as to pass spirally downwardly around screen member 5 while at the same time passing radially inwardly through the latter to be discharged as a cleaned stream by way of outlet port means 4. In view of the downward centrifugal flow of the stream from the inlet 14, there will be some self-cleaning effect of particulates along the upper outer surface of screen member 5, particularly by reason of the transverse or angular sweeping effect of the inlet stream across the screen 5 such that dislodged particles can fall by gravity into the lower portion of the chamber which will be permitted to be at least periodically withdrawn from a particle outlet means 15 which extends radially outwardly from chamber 1 at a zone just above the lower bottom plate member 3.

In a preferred arrangement, as illustrated in the present embodiment, outlet port means 15 is rotatable and has an extended open faced portion 15' adapted to be within the annular space between the chamber wall and the lower portion of screen 5 so that there is an open portion which can be rotated to have a full open face vertically or, alternatively, be rotated to have at least partial blockage along a vertical face. Thus, there is a certain amount of adjustment of discharge flow from the unit. Reference to FIG. 2 of the drawing illustrates, in a sectional view, the full open position for 15', while at the same time there is shown in a dash line positioning, that there may be rotation in a clockwise direction to permit a decreased intake of particulates from the bottom of the chamber 1 into the discharge port section 15. Rotatable port 15, as is diagrammatically illustrated in FIG. 1, may be held in place by packing or an O-ring means 16 in turn held in place by a surrounding boss or shoulder section 17 and a cap ring 18 held by adjustable cap screw members 19.

In accordance with the preferred construction for the rotatable cylindrical screen 5, and as best shown partially in section in FIG. 1, there is a spirally wound wire 5' around spaced vertical bars 20 to effect the construction of such screen. The wire 5' will have a triangular or trapezoidal cross-section, with the wide portion toward the outside of the screen and it will be continuously helically wound around the bars 20 to provide a small predetermined space between windings. The spacing between wires can, of course, vary but will be predetermined in constructing a particular screen member 5 so as to accommodate itself to a particular size of particulates which will be carried by the laden stream entering inlet means 14.

As best shown in FIG. 3 of the drawing, the spaced bars 20 are of a thin rectangular form in cross section such that they may serve as longitudinal vanes throughout the length of the cylinder-form screen member 5 when it is rotated. FIG. 3 also illustrates by arrow means that the screen will be rotated in a counter-clockwise direction so that the rod means 20 will in turn serve as paddles or vane means to cause localized outward flow of the fluid stream through the slots or openings of screen member 5 and serve to dislodge particulates which may be adhering to the outer face of the screen. This outward flow dislodgement is, of course, in addition to the "shearing" removal which will be caused by the simple rotation of screen member 5 within the chamber 1. The resulting dislodged particulates will gradually fall by gravity to the lower end of the chamber and be discharged in a bleed stream by way of outlet port means 15. As hereinbefore noted, the rotation of screen member 5 may be at predetermined periods of time when it is determined that there will be undue clogging and blocking of particulates on the outside face of the screen. However, as also noted briefly hereinbefore, there may be a slow continuous rotation of screen member 5 by its motor means such that there is simultaneously an inward radial flow of the fluid stream being cleaned and a continuous discharge of a cleaned stream from the lower end of the unit by way of outlet port 4 as well as the continuous shear type of surface cleaning and the localized flow of a portion of the fluid stream by virtue of the rotational movement of the screen and the vane means 20 therein.

In FIG. 4 of the drawing, there is indicated an optional curved form of bar member 21, in lieu of the plurality of spaced bar means 20, such that there is enhanced vane action during a rotational movement of screen 5. In other words, it is not intended to limit the longitudinal support bar means to any one particular shape or configuration inasmuch as round bars, oval bars, rectangular bars, curved bars or other shapes can all provide some degree of vane action and modified configurations are merely of advantage in enhancing the outward flow due to a particular vane configuration.

Referring now to FIG. 5 of the drawing, there is shown an automated arrangement for the rotational operation of the improved filtering device with the rotatable cylindrical-form screen member. Specifically, there is indicated diagrammatically an external portion of chamber 1 with the inlet means 14 and the cleaned stream outlet means 4 as having pressure tap means 22 and 23 connected by respective lines 24 and 25 to a differential pressure controller 26. The latter in turn connects through line 31 with a flow control valve 27 in a line 28 from outlet port 4, as well as with a valve 29 in a flush line 30 through a line 31', whereby the clean water outlet through line 28 may be blocked to preclude back flow and there may be the introduction of a fresh water back-washing stream by way of line 30 and port means 4' and 4 into the interior of screen 5. At the same time, differential pressure controller 26 connects with the motor means 12 by way of line 32 such that rotation of cylindrical screen 5 is initiated when valving means 27 and 29 are regulated. In other words, in the automatic operation of the unit for rotative cleaning and back-wash, there will be a sensing of an undue pressure drop through the unit from pressure readings at 22 and 23 whereby controller will initiate the back-washing operation.

In an alternative operation, there may be the use of a timer 33 connective with control means 26 by way of line 34 and with the motor means by way of lines 35 and 32, whereby the motor 12 will be periodically caused to rotate screen 5 and effect a shear-type rotative cleaning of particles from the outer surface of screen 5 while initiating back-wash flow through line 30 and port means 4. Actually, where desired, the timer means can be caused to operate only the motor means and there need be no connection to the differential pressure control or any other control means to initiate a back-wash flow. The rotation of screen 5 can be relied upon to effect the back-wash flow from vane means 20 or 21 and combine with the shear type of particle dislodgement to effect the cleaning of the screen.

In FIG. 5 of the drawing, there is also indicated the utilization on an air cylinder or hydraulic cylinder 36 receiving fluid powered from line 37 and control valve 38 whereby there may be partial rotation of the particle outlet nozzle 15, the latter being connected to the piston rod 39 of cylinder unit 36 through arm means 40 and connector pin 41. The upper end of piston member 36 is shown connected through pin 42 to a bracket 43 on the lower side of inlet nozzle 14. Thus, there can be a throttling or respositioning of the open faced inlet end 15' on nozzle means 15 responsive to the initiation of a back-wash operation in the filter unit. In other words, where the motor means is rotating the screen 5 or on those occasions that the screen is rotated simultaneously along with a back-washing operation from fresh water introduced at line 30 and port means 4' and 4 into the interior of the screen 5, there will be a rotation of nozzle means 15 such that 15' has a full vertical open portion facing the counter-clockwise movement of the screen member 5. Thus, particulates being dislodged from such screen will be rapidly and efficiently removed from the lower interior portion of the chamber 1 and be permitted to be discharged from the unit along with a bleed stream of fluid. The operation of piston 36 from a valve means 38 in line 37 is indicated in FIG. 5 as being controlled from the differential pressure control 26 so that the full opening or partial closing of the particle orifice from nozzle 15 can be made responsive to the automated system regulating the motor 12 operation as well as correlated with the closing of clean fluid outlet means with valve 27 and the introduction of back-wash flow from line 30.

It is to be noted that it is recognized that varying types of flow control systems, back-wash arrangements and automatic starting of motor means for the rotation of the inner cylindrical-form screen, can be designed and implemented in various manners, as well as by various sensing systems. Thus, it is realized that various alternative embodiments can be utilized and it is not to be limited by the embodiments described herein and they should not be considered limiting in connection with the basic improved form of rotatable self-cleaning type of filtering screening unit such as provided by the present invention.

Still further, it will be obvious to those skilled in the arts that various types of bearings, seal means, motor means, and motor connecting means may be provided in connection with effecting the desired rotation of an internal screen member within the filter unit without departing from the scope of the present improved device. In other words, the bearing means and seal ring means which have been illustrated in the present drawing are merely diagrammatic and other equivalent forms of power operation and fluid sealing means may well be used.

I claim:

1. In a fluid strainer apparatus which provides for the passage of a fluid stream flow around and into a cylindrical screen that is positioned to have a cleaned stream removed longitudinally from within the screen and particulates removed from therearound, the improved construction providing for the powered turning of the cylindrical screen to enhance removal of lodged particulates and radial outward back-wash fluid flow, which comprises in combination:
   a. rotatable support means for the cylindrical screen;
   b. conduit means connecting to the interior of said support means for said screen, and back-wash fluid inlet means to said conduit means for radial outward flow,
   c. motor means connective with said screen for at least periodically rotating such screen; and,
   d. internal vane means within said screen positioned to enhance an outward flow of a portion of the fluid to thereby aid in cleaning the outside of the screen during periods of its rotation.

2. The fluid strainer apparatus of claim 1 further characterized in that said screen is formed of a wound, wedge-shaped element means having the wider portion thereof adjacent the outer surface to provide resulting slot means between windings of the wedge-shaped element means whereby there is an increase in cross-sectional area toward the interior of the screen and in turn a non-clogging form of screen unit.

3. The fluid strainer apparatus of claim 1 further characterized in that said screen utilizes a wedge-shape wire continuously and helically wound around spaced longitudinal bar members to provide open slot area between adjacent windings of the wedge-shaped wire, and each of said longitudinal bars are elongated in their cross sections and positioned with the elongated dimension along radial lines for the cylindrical-form screen member, whereby the elongated dimension provides a pumping vane type action when said cylinder screen is rotated about its axis.

4. The fluid strainer apparatus of claim 3 still further characterized in that said spaced bar means are provided with a curved vane type of cross section to thereby provide an impeller type of action when said screen is rotated.

5. The fluid strainer apparatus of claim 1 further characterized in that said motor means comprises a fluid motor and the discharge of the fluid medium powering said motor means is through a hollow shaft portion connecting said motor means with said rotatable cylindrical screen, whereby fluid is discharged into the interior of the latter and there is radial outward flow therefrom to enhance the removal of particulates from an outer surface.

6. The fluid strainer apparatus of claim 1 further characterized in that said cylindrical screen is positioned within a central portion of a chamber and a separate particle removal outlet means is provided from the lower portion of said chamber whereby dislodged particulates may be removed therefrom and said particle outlet means has adjustable inlet means at the entrance thereof whereby to adjust the rate of particle removal from said apparatus.

7. The fluid strainer apparatus of claim 6 still further characterized in that said particle outlet means is rotatable and has an internal open face portion adapted to receive entrained and dislodged particulates, fluid piston means connects through linkage means to a side portion of said particle outlet means whereby to effect rotation of the latter and positioning of the internal portion thereof and said fluid piston means is operative through said linkage means to the particle outlet means whereby the latter is substantially adjusted to an open position as said cylindrical screen is being rotated within said chamber.

8. A fluid strainer apparatus providing for rotation of an inner cylindrical-form screen section which comprises in combination, an external chamber with fluid inlet means to one end thereof and fluid outlet means axially from the opposing end thereof, a cylindrical form rotatable screen positioned axially in said chamber and spaced inwardly from the inner wall thereof to provide an annular space therearound, rotatable support means for said cylindrical-form screen for each end of said chamber, motor means connective with one end of said screen at an end opposing said outlet end of said chamber whereby the screen can be rotated, and whereby the laden stream to the inlet end of the said chamber will flow around said cylindrical-form screen and radially inwardly to result in a clean stream being axially discharged from the interior of said screen and from said chamber, a particle outlet means with a rotatably adjustable particle inlet portion to in turn regulate dislodged particle outlet flow and whereby particulates may be discharged from said chamber along with a bleed stream of fluid therefrom, valve means connective with said cleaned stream outlet means from said chamber, and a valved controlled back-wash inlet means connective with said cleaned stream outlet means whereby back-wash flow may pass into the interior of said rotatable screen section and pass radially outwardly therefrom during periods of screen cleaning operation.

9. The apparatus of claim 8 further characterized in that pressure sensing means connects with said fluid stream inlet means and with said clean stream outlet means, said pressure sensing means in turn connect with a differential pressure controller, said pressure controller connects with valve means connective with said clean stream outlet means and with said valve means connective with said back-wash fluid inlet means, and said differential pressure controller means additionally connects with said motor means, whereby the latter initiates the rotation of said screen means responsive to a predetermined pressure differential operating said differential pressure control to start said motor means, and, additionally, said valve means for said cleaned stream outlet means is closed while said valve means for said back-wash stream is opened.

10. The apparatus of claim 8 still further characterized in that timer means connects with said motor means whereby the latter and the connecting rotatable screen are operative to in turn effect periodic dislodgements of particles from the face of said screen.

* * * * *